(12) United States Patent
Rumbaugh

(10) Patent No.: US 8,287,674 B2
(45) Date of Patent: *Oct. 16, 2012

(54) METHOD OF PROVIDING TIRE WITH AIR-FLOW RESTRICTOR

(76) Inventor: Garry L. Rumbaugh, Westminster, MD (US)

( * ) Notice: Subject to any disclaimer, the term of this patent is extended or adjusted under 35 U.S.C. 154(b) by 1350 days.

This patent is subject to a terminal disclaimer.

(21) Appl. No.: 11/978,657

(22) Filed: Oct. 30, 2007

(65) Prior Publication Data

US 2008/0047640 A1   Feb. 28, 2008

Related U.S. Application Data

(62) Division of application No. 11/071,335, filed on Mar. 4, 2005, now Pat. No. 7,290,577.

(60) Provisional application No. 60/572,754, filed on May 21, 2004.

(51) Int. Cl.
*B29D 30/06* (2006.01)
*B60C 5/24* (2006.01)
*B60C 5/20* (2006.01)
*B60C 5/02* (2006.01)
*B60C 5/00* (2006.01)
*B60C 19/00* (2006.01)

(52) U.S. Cl. ............ 156/110.1; 152/153; 152/450; 152/333.1; 152/336.1; 152/512

(58) Field of Classification Search ......... 152/157, 152/335.1, 336.1, 337.1, 331.1, 333.1, 334.1, 152/338.1, 192–195, 155, 156, 317, 158–166, 152/153, 450, 512; 156/110.1

See application file for complete search history.

(56) References Cited

U.S. PATENT DOCUMENTS

| | | | |
|---|---|---|---|
| 200,572 A | 2/1878 | Ruge | |
| 456,771 A | 7/1891 | McCune | |
| 500,205 A | 6/1893 | Heysinger | |
| 502,047 A | 7/1893 | Morgan et al. | |
| 503,560 A | 8/1893 | Callaghan | |
| 506,550 A | 10/1893 | Rosentreter | |
| 508,173 A | 11/1893 | Kupfer | |
| 509,549 A * | 11/1893 | McMahan | 152/336.1 X |
| 557,441 A | 3/1896 | Scott | |
| 567,993 A | 10/1896 | McClymonds | |
| 573,392 A | 12/1896 | Collins | |
| 575,551 A | 1/1897 | Moore | |

(Continued)

FOREIGN PATENT DOCUMENTS

FR   325.898   *  5/1903   .......... 152/336.1

(Continued)

OTHER PUBLICATIONS

Webster's Third New International Dictionary, Unabridged, Merriam-Webster, Inc., 1993, definition of "collar".*

(Continued)

*Primary Examiner* — Adrienne C Johnstone

(74) *Attorney, Agent, or Firm* — Andrews Kurth LLP; Aldo Noto; Michael Ye

(57) ABSTRACT

An improved tire provides an air-flow restrictor that may be installed inside a tire. The air-flow restrictor may restrict or prevent the flow of air in the direction opposite to the direction of rotation of the tire. Also, a method for saving fuel by inserting or retrofitting tires with air movement restricting inserts.

13 Claims, 13 Drawing Sheets

U.S. PATENT DOCUMENTS

| | | | |
|---|---|---|---|
| 578,191 A * | 3/1897 | Bartlett et al. ............ 152/334.1 |
| 582,172 A | 5/1897 | Browne |
| 599,802 A | 3/1898 | Shaw |
| 603,710 A * | 5/1898 | Sewell .................... 152/336.1 X |
| 682,057 A | 9/1901 | Germain |
| 768,684 A | 8/1904 | Parmley |
| 778,153 A | 12/1904 | Sullivan |
| 856,411 A * | 6/1907 | Mains |
| 865,698 A | 9/1907 | Hendler |
| 911,041 A | 2/1909 | Hicks |
| 963,320 A * | 7/1910 | Peck ...................... 152/336.1 X |
| 985,397 A * | 2/1911 | Coleman |
| 1,005,627 A * | 10/1911 | Fiset et al. |
| 1,051,738 A | 1/1913 | Kavanagh |
| 1,187,637 A * | 6/1916 | Malsin ...................... 152/317 X |
| 1,190,744 A | 7/1916 | Fenton |
| 1,202,695 A | 10/1916 | Fenton |
| 1,223,827 A * | 4/1917 | Pearson |
| 1,226,563 A | 5/1917 | Miller |
| 1,229,175 A | 6/1917 | Christopherson |
| 1,243,513 A * | 10/1917 | Grubb ........................ 152/336.1 |
| 1,248,045 A | 11/1917 | Wenzel, Jr. |
| 1,263,176 A | 4/1918 | Wenzel, Jr. |
| 1,264,100 A * | 4/1918 | Linville .................... 152/337.1 |
| 1,317,976 A | 10/1919 | Hower |
| 1,322,685 A * | 11/1919 | Franklin |
| 1,339,283 A * | 5/1920 | Perkins ...................... 152/337.1 |
| 1,340,704 A | 5/1920 | Dech |
| 1,341,380 A * | 5/1920 | Meyer |
| 1,395,614 A | 11/1921 | Stock |
| 1,396,170 A * | 11/1921 | Emeno ......................... 152/157 |
| 1,432,603 A | 10/1922 | Landsmand |
| 1,436,782 A | 11/1922 | Shaw |
| 1,453,351 A * | 5/1923 | Haupt |
| 1,476,111 A | 12/1923 | Simes |
| 1,486,055 A | 3/1924 | Stranahan et al. |
| 1,881,309 A * | 10/1932 | Campu |
| 1,886,094 A * | 11/1932 | Guenard .................... 152/337.1 |
| 1,905,361 A | 4/1933 | Bacon |
| 1,930,040 A | 10/1933 | Crowley |
| 2,122,740 A | 7/1938 | Eckenroth |
| 2,136,510 A | 11/1938 | Jensen |
| 2,143,471 A * | 1/1939 | Booharin .................... 152/336.1 |
| 2,155,206 A | 4/1939 | Steindel |
| 2,207,212 A | 7/1940 | Arey |
| 2,223,007 A | 11/1940 | Legowsky et al. |
| 2,241,847 A | 5/1941 | Eberhard et al. |
| 2,269,244 A | 1/1942 | Berry |
| 2,339,381 A | 1/1944 | Crowley |
| 2,343,828 A | 3/1944 | Burkley |
| 2,468,954 A | 5/1949 | Bonham |
| 3,208,497 A | 9/1965 | Schutt |
| 4,008,743 A | 2/1977 | Welch |
| 4,293,017 A | 10/1981 | Lambe |
| 4,909,295 A | 3/1990 | Nirei et al. |
| 5,180,455 A | 1/1993 | Cheng |
| 5,479,974 A | 1/1996 | Noggle et al. |

FOREIGN PATENT DOCUMENTS

| | | | | |
|---|---|---|---|---|
| FR | 677.441 | * | 3/1930 | |
| GB | 8676 | * | 0/1897 | |
| GB | 12756 | * | 0/1894 | ................ 152/336.1 |
| GB | 16819 | * | 0/1897 | ................ 152/336.1 |
| GB | 23172 | * | 0/1910 | |
| GB | 444870 A | * | 6/1934 | ................ 152/336.1 |
| GB | 1503483 A | * | 3/1978 | |

OTHER PUBLICATIONS

International Search Report issued Sep. 28, 2006 in counterpart foreign application in WIPO under application No. PCT/US05/17432.

* cited by examiner

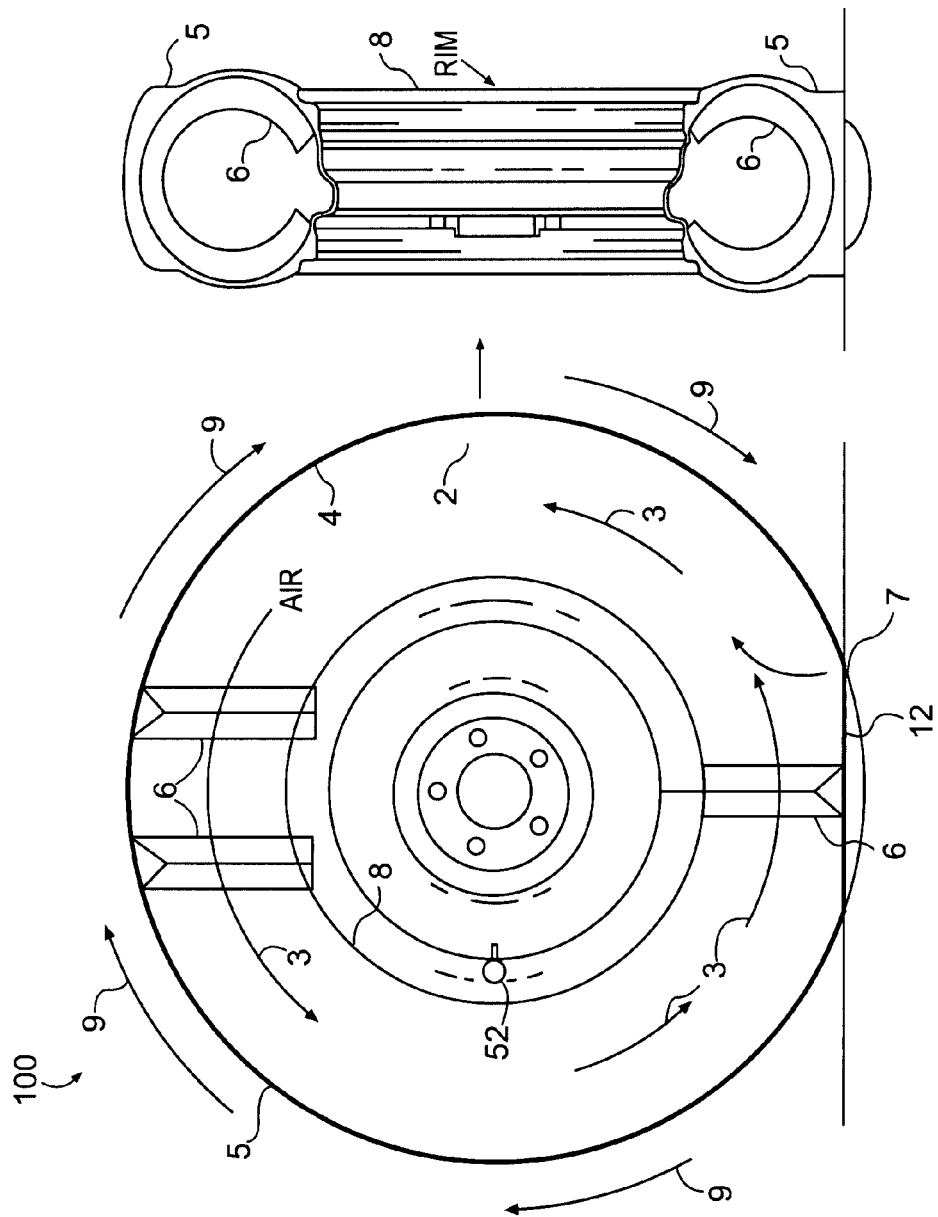

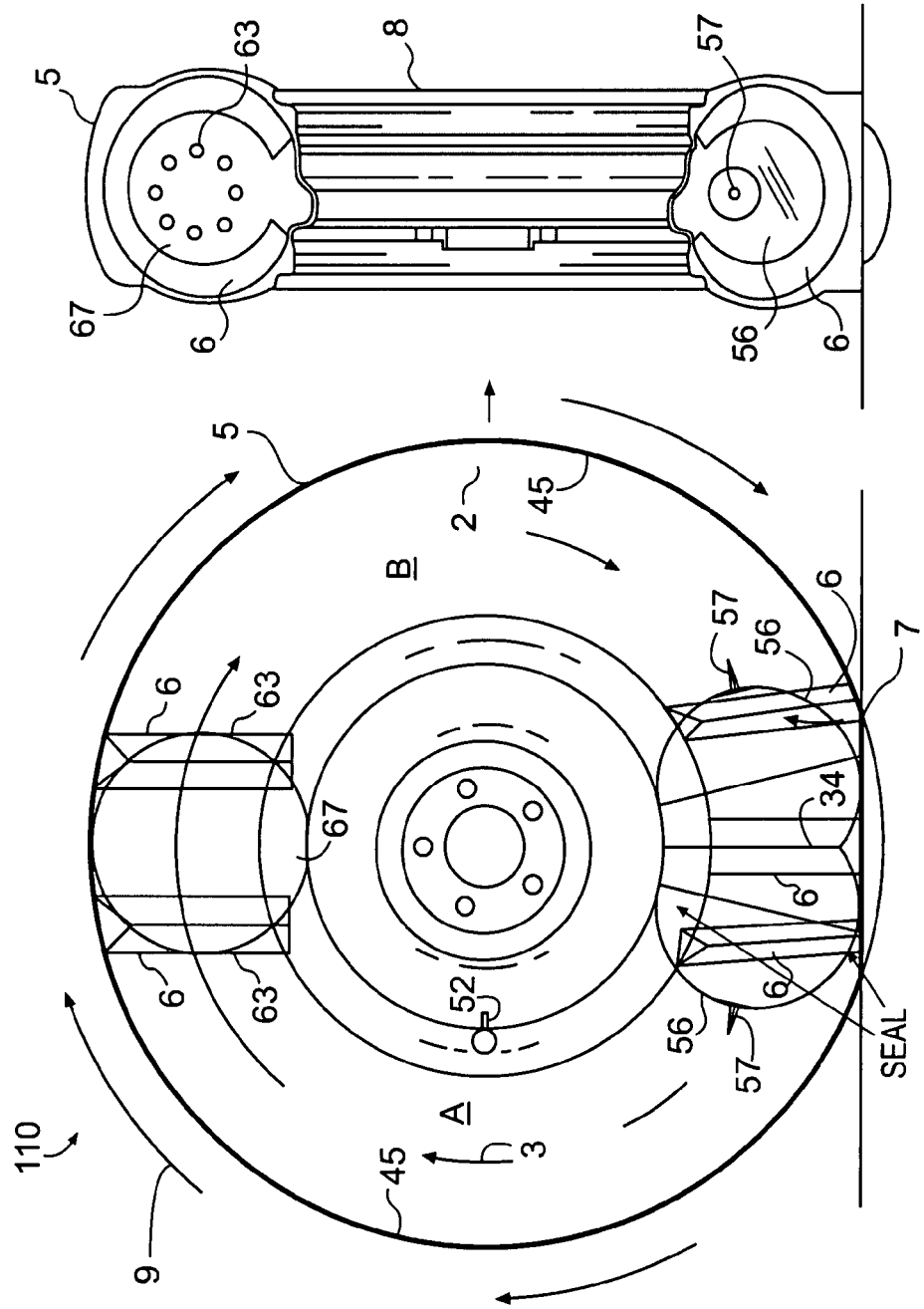

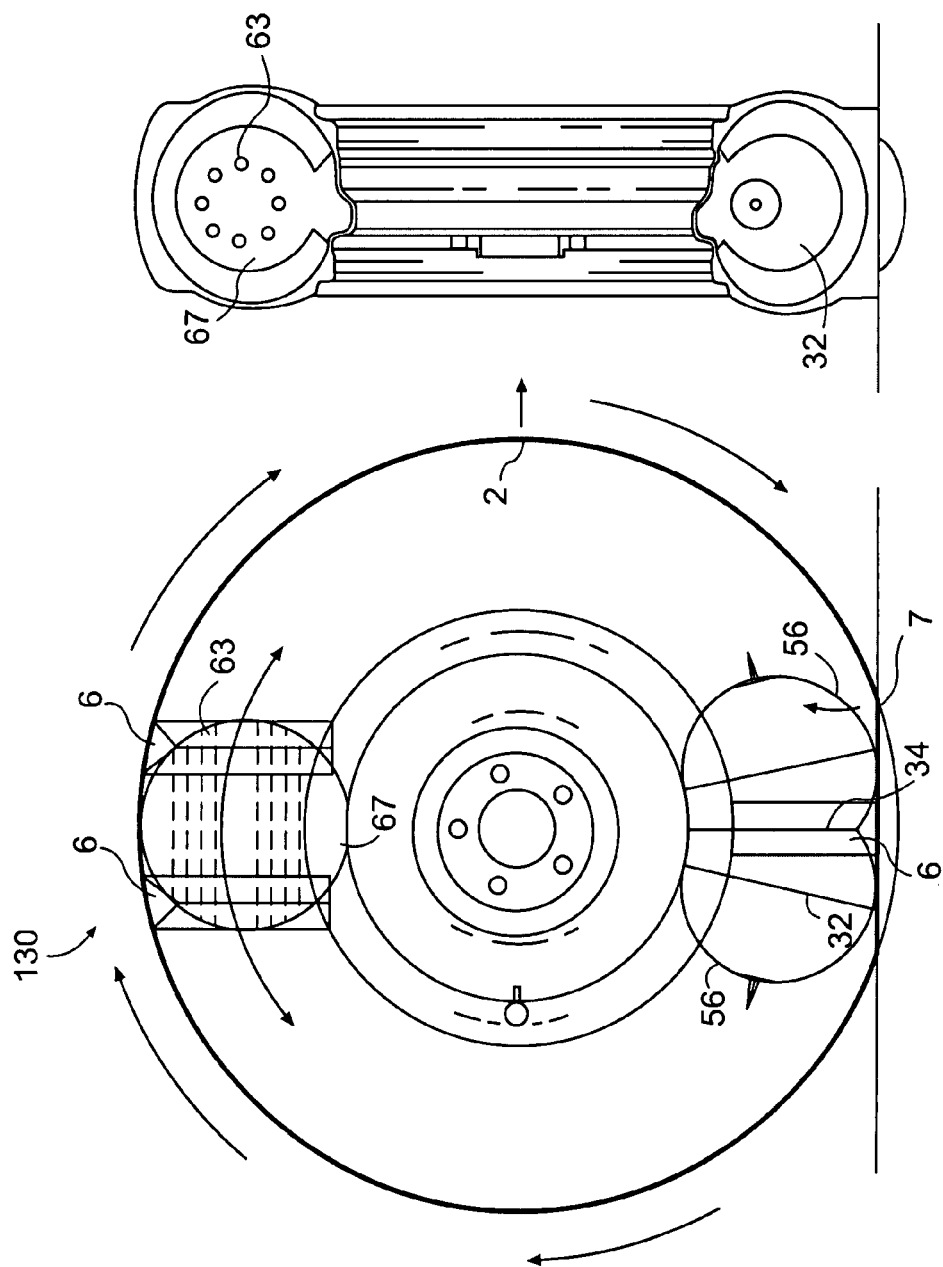

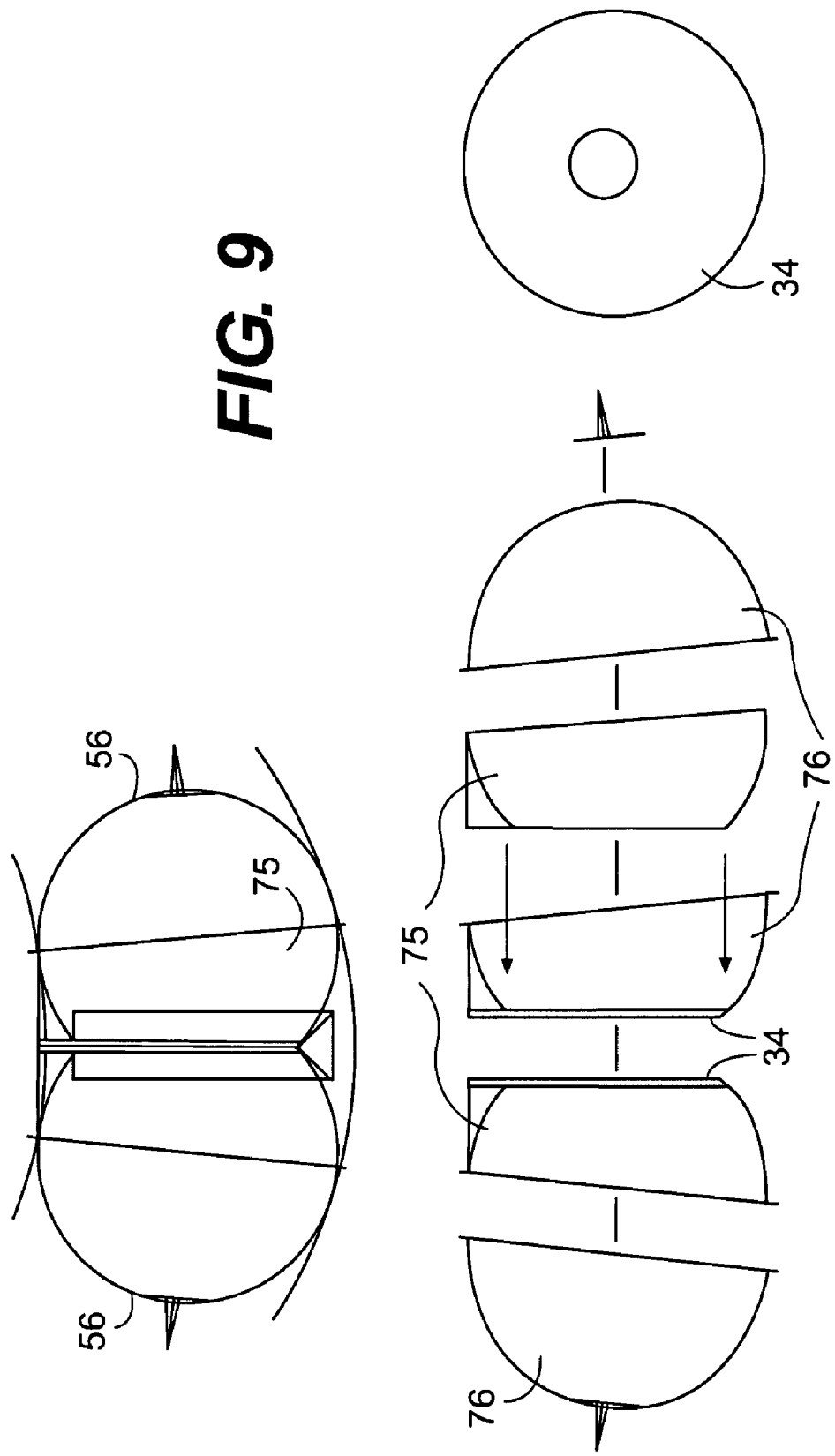

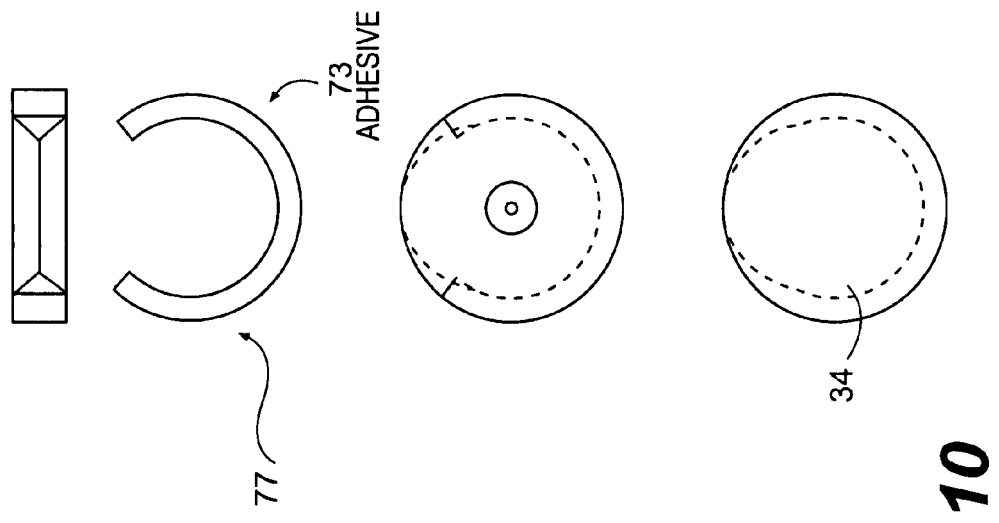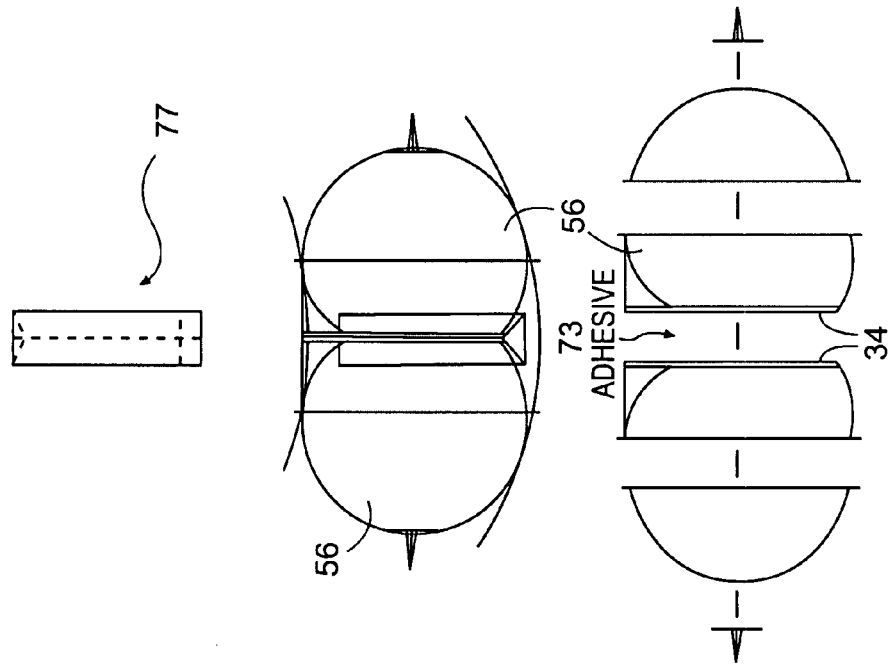
FIG. 10

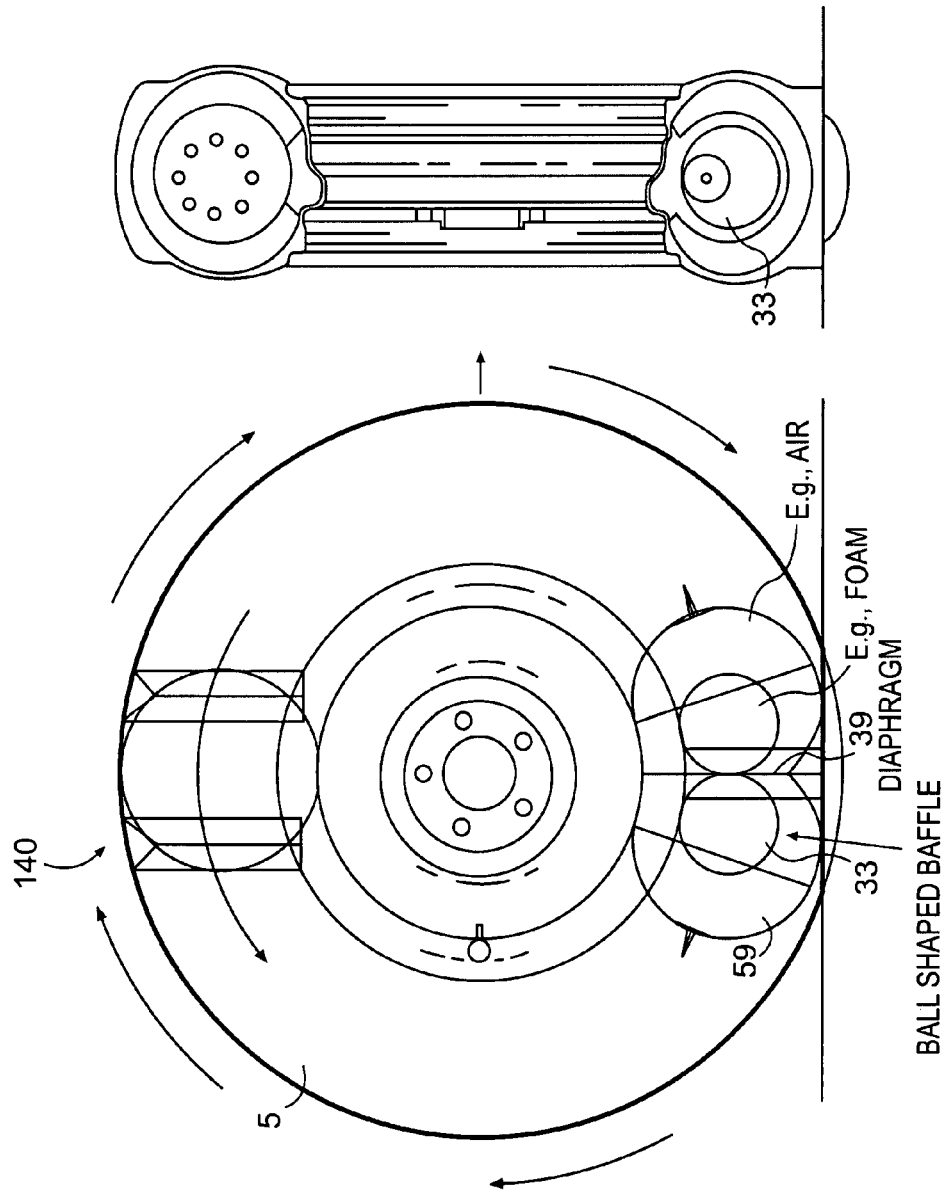

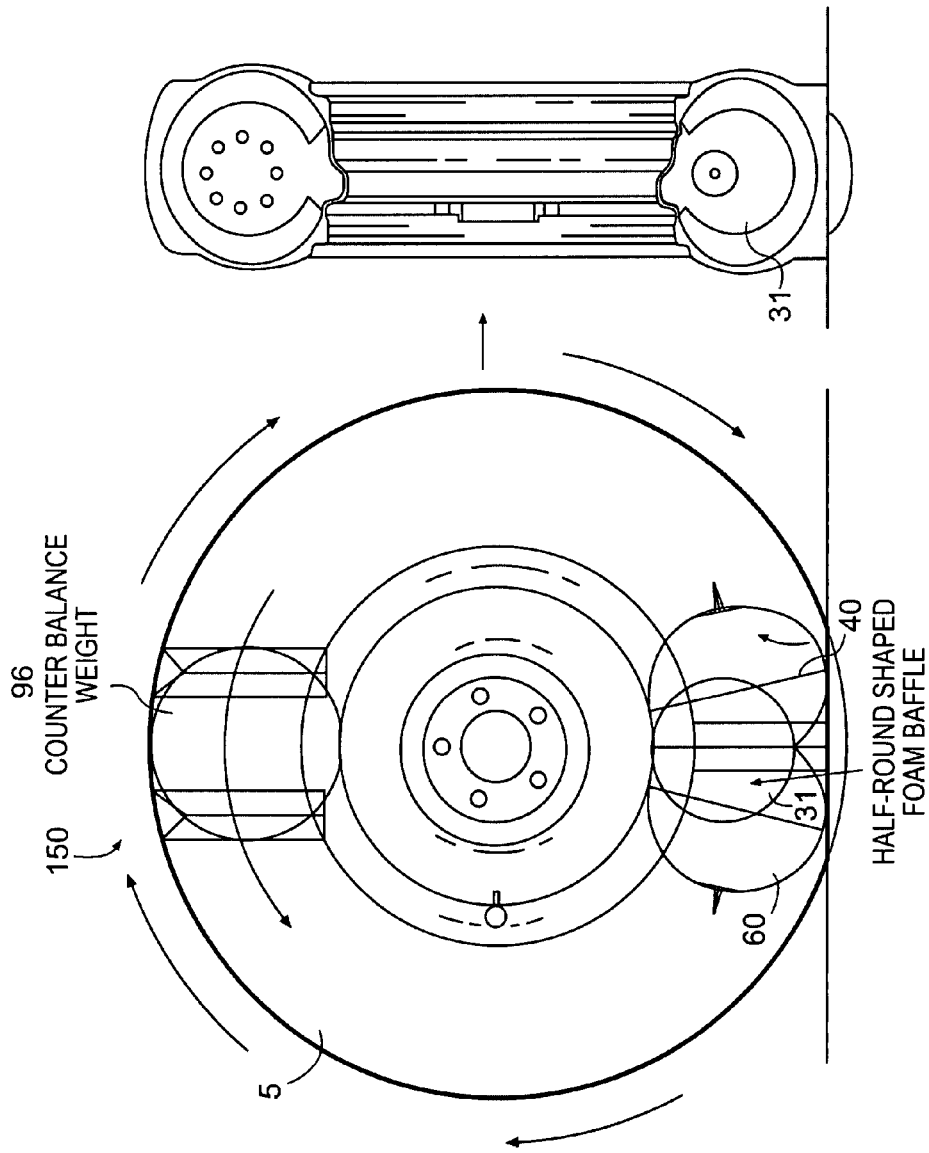

METHOD OF PROVIDING TIRE WITH AIR-FLOW RESTRICTOR

REFERENCE TO RELATED APPLICATIONS

This application is a division of U.S. patent application Ser. No. 11/071,335, filed Mar. 4, 2005, now U.S. Pat. No. 7,290,577, issued Nov. 6, 2007, which claims priority of U.S. Provisional Application No. 60/572,754, filed May 21, 2004.

TECHNICAL FIELD

The present invention relates to an improved tire. In particular, it relates to tires that may reduce internal friction and/or heat which may result in decreased drag and/or increased life of the tire.

BACKGROUND OF THE INVENTION

Conventional tires used for transportation, bicycles, or other recreational vehicles and the like generate considerable friction when the tire is in motion. Some of this friction is caused by the flow of fluids such as air inside an air filled tire.

For example, when a hollow air filled tire rotates, the air inside the tire rotates or flows in a direction opposite the direction of motion. As a result, significant friction is generated within the tire. This friction can cause drag opposite the direction of motion. This drag in turn causes the efficiency of the tire as well as the life of the tire to be reduced.

SUMMARY OF THE INVENTION

In an embodiment, the present invention provides an air-flow restrictor that may be installed inside a tire. The air-flow restrictor may restrict or prevent the flow of air in the direction opposite to the direction of rotation of the tire.

BRIEF DESCRIPTION OF THE DRAWINGS

Embodiments of the present invention are illustrated by way of example, and not limitation, in the accompanying figures in which like references may denote similar elements or different elements, and in which:

FIG. 1 is a diagram of a wheel assembly 100 in accordance with an embodiment of the present invention.

FIG. 2 is a diagram of another view of the wheel assembly 100 in accordance with an embodiment of the present invention.

FIG. 3 is a diagram of a wheel assembly 110 in accordance with an embodiment of the present invention.

FIG. 4 is a diagram of another view of the wheel assembly 110 in accordance with an embodiment of the present invention.

FIG. 7 is a diagram of a wheel assembly 130 in accordance with an embodiment of the present invention.

FIG. 8 is a diagram of another view of the wheel assembly 130 in accordance with an embodiment of the present invention.

FIG. 9 is a diagram of an air restrictor in accordance with an embodiment of the present invention.

FIG. 10 is a diagram of an air restrictor and a retention collar in accordance with an embodiment of the present invention.

FIGS. 13A and 13B are diagrams of a wheel assembly 140 in accordance with an embodiment of the present invention.

FIGS. 14A and 14B are diagrams of a wheel assembly 150 in accordance with an embodiment of the present invention.

DETAILED DESCRIPTION

Figures 5, 6:
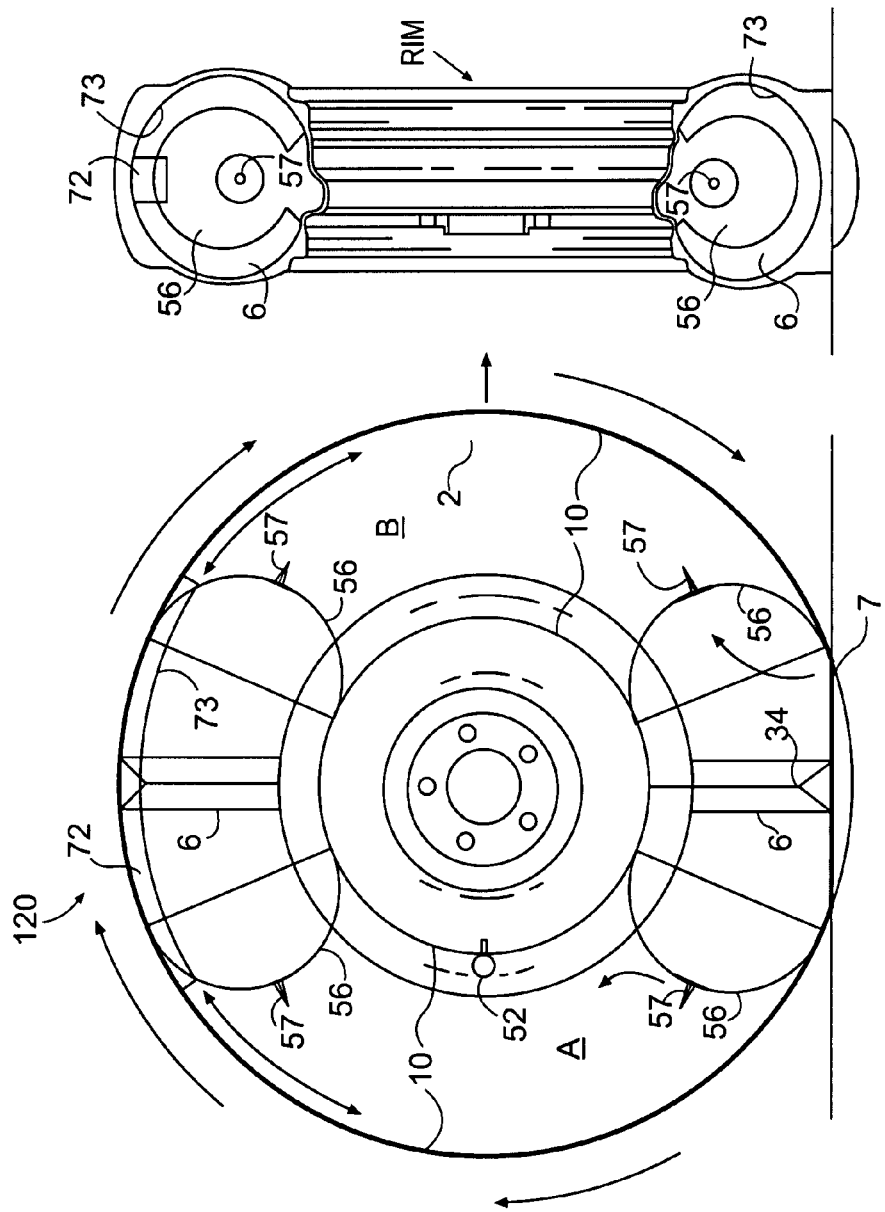
FIG. 5 is a diagram of a wheel assembly 120 in accordance with an embodiment of the present invention.
FIG. 6 is a diagram of another view of the wheel assembly 120 in accordance with an embodiment of the present invention.

An embodiment of the present invention provides an improved tire in which an air-flow restrictor such as a diaphragm, wall, barricade, spheres (or other shapes) or the like may be used to substantially, partially or fully stop the air or fluid circulation inside the tire. In an embodiment of the invention, the air restrictor may restrict or prevent the flow of air or fluid in the direction opposite to the direction of rotation of the tire. Thus when the air flow is restricted, the air may move substantially, fully or partially in the same direction as the direction of motion of the tire. This results in reduced friction and/or heat inside the air cavity of the tire. In an embodiment of the present invention, the reduced friction and/or heat inside the tire may improve the efficiency of the tire and/or may increase the life of the tire.

In accordance with an embodiment of the present invention, FIG. 1 shows a wheel assembly 100 which includes wheel rim 8 and tire 5. Tire 5 may be a tubeless tire. As can be seen in FIG. 1, the wheel assembly 100 is moving in direction 2 with the shown rotation 9. The rotation direction 3 of the air inside the tire is in the opposite direction of the rotation 9 of the assembly 100. This rotation direction 3 of the internal air is in part caused by the weight of a vehicle or the like which causes a deflection 12 where the tire 5 contacts the road surface. The resulting force moment 7 may initiate the rotation 3 of the air inside the tire 5. The rotation direction 3 of the air inside the tire 5 in part may cause friction 4 to build up inside the tire 5.

In an embodiment of the present invention, one or more retention collars 6 may be installed or may be built into the assembly 100. The retention collars may be made of any type of material such as a polymer, plastic, rubber, organic or the like, or any combination thereof. Moreover, it is recognized that the retention collars may be made from any type material such as a metal, alloy, polymer, or the like, or any combination thereof. The retention collars 6 may be made of any type of flexible, rigid and/or semi-flexible material. The retention collars may be attached in the assembly 100 using, for example, contact cement, glue, welds, staples, nails, and/or by any other means.

Although the rim 8 is shown in the FIG. 1 and FIG. 2, it is recognized that the retention collars 6 may be installed exclusively inside the tire 5. Thus, no attachment to the rim may be needed. In another embodiment, attachment to the rim may be possible for mounting.

FIG. 2 is another view of the assembly 100 shown in FIG. 1, in accordance with an embodiment of the present invention. FIG. 2 shows the tire 5, rim 8 and one or more retention collars 6. The retention collars 6 may be used to retain or secure air-flow restrictors which restrict the air flow (described below in more detail), in accordance with an embodiment of the invention. It is recognized that other variations of retention collars may be used. It is also recognized that the air restrictors may be installed without the use of retention collars by using other techniques or ways of securing the air restrictors.

FIG. 3 shows a wheel assembly 110 in accordance with an embodiment of the present invention. The assembly 110 shown in FIG. 3 includes a device or object for restricting the flow of air inside the tire 5. For example, the device for restricting the flow of air within the tire 5 may be a diaphragm, membrane or any other device or object that does not allow air to permeate through, thus restricting the flow of air inside the tire.

An object or device for restricting the flow of air is generically referred to herein as "air restrictor." Unless otherwise stated, the air restrictor may refer to any of the devices disclosed herein for restricting air-flow inside the tire and any variations thereof. It is recognized that, when the tire is in rotational motion, the air or fluid flow is restricted in the direction opposite to the direction of rotation of the tire. Thus, the air moves in the same direction as the direction of rotation of the tire, reducing at least some of the internal friction. Moreover, an air restrictor may be impermeable or may be permeable. In other words, if indicated, the air restrictor may permit some air to pass through.

In an embodiment of the present invention, an air restrictor may be an object 67 in the shape of a sphere, sphere-like, or any other shaped object that prevents the flow of air. It is recognized that an air restrictor may be square, flat, oval, accordion like, spring like, rectangular and/or any other shape. The air restrictor 67 may be installed within the retention collars 6, in accordance with an embodiment of the present invention. As indicated above, the retention collars 6 may be used to retain or secure air-flow restrictors 67 in place. Although, two retention collars 6 are shown FIG. 2, it is recognized that a single retention collar 6 may be used to retain or secure air restrictor 67 in place. Alternatively, the air restrictor such as restrictor 67 may be installed without retention collars. For example, the air restrictor may be attached with contact cement, glue, nails. Tacks, welds and/or by any other means. In an embodiment of the present invention, if, for example, if a single object or air restrictor such as sphere 67 is used, the sphere 67 may be made from a material that is impermeable to air. In other words, the sphere 67 would be made from any material or materials that would completely restrict or block the flow of air through the restrictor 67. The restrictor 67 may be made from latex, plastic, rubber, and/or any other material and/or any combination thereof. It is also recognized that other retention collar designs may be used to retain or secure the air-flow restrictor.

As described above, the air restrictor 67 may be installed using one or more retention collars 6, for example. It is recognized that the retention means may be of any shape or form. It is noted that the installation of the air restrictor may cause the rotation direction 3 of air inside the tire 5 to change direction. In other words, the air restrictor, for example, sphere 67 may cause the direction of air-flow 3 inside the tire to be the same as the direction of rotation 9 of the tire 5. The flow of air in the same direction as the direction of rotation 9 may reduce the friction inside the tire.

In an embodiment of the present invention, a second air restrictor 56 may be inserted within the assembly 110, as shown in FIG. 3. The second air-restrictor may act as a counter balance to the first air restrictor 67, or vice-versa. The second air restrictor may counter balance the weight, shape and/or size of the first air restrictor. This counter balance (e.g., the second air restrictor) may keep the tire from vibrating, wobbling, shifting, etc. when the tire is in motion. The second air restrictor 56 may be of any shape such as the double or joined spheres 56 shown in FIG. 3. It is recognized that the second air restrictor 56 may be square, flat, oval, accordion like, spring like, rectangular and/or any other shape. The air restrictor 56 may be mounted using one, two, three or more retention collars 6. It is also recognized that the air restrictor 56 may be mounted using contact cement, glue, etc. It is recognized that a lead weight or other object may be installed on the tire as a counter balance to the first air restrictor.

Referring to FIG. 3, if the first air restrictor 67 is impermeable to air (i.e., may not let air pass through), then the second air restrictor 56 may be permeable to air (i.e., may permit air to pass through), in accordance with an embodiment of the present invention. In this case, the air restrictor 56 may be made of any permeable material such as open cell foam, or the like. If two air restrictors are used, then air chambers A and B may be created within the tire 5. If one of the restrictors is permeable to air, then pressure throughout the tire may be the same. In this case, only one air valve 52 may be needed to inflate the tire since air will be able to flow between chambers A and B. Moreover, the air in chambers A and B may help to compress and/or seal the air restrictors 56 and/or 67. Additionally or optionally, air restrictor 56 may contain an air passage or vent holes to permit air to flow between chambers A and B.

In an embodiment of the present invention, the air restrictor 56 may be impermeable to air. In other words, air restrictor 56 may also prevent the flow of air between chambers A and B. In this case, the air restrictor 56 may be made from any material or materials that prevent the passage of air, for example. Optionally or additionally, air the air restrictors may include a latex membrane 34 to stop circulation of air in the tire as shown in FIG. 3. In one embodiment, an air restrictor may simply be a latex membrane 34 which prevents the passage or air and/or prevents the flow of air inside the tire 5. In the case, where both air restrictors 67 and 56 do not permit the passage or air, two (2) separate chambers A and B inside tire 5 are created which need to be pressurized separately. In this case, in order to pressurize chambers A and B, a second valve 52 (omitted) may be needed for chamber B.

In an embodiment of the invention, if air restrictor 56 does not permit passage of air (i.e., if air restrictor 56 is impermeable), then air restrictor 67 may allow air to pass through instead (i.e., air restrictor 67 may be permeable). In this case, air restrictor 67 may be made from open cell foam or other material that allows air to pass and/or may include vent holes 63 or another type of air passage. Where one of the air restrictors allows air to pass through, only one valve 52 may be needed to pressurize the tire 5 since air will be able to flow through at least one of the other restrictors.

In an embodiment of the invention where two or more air chambers A and B are created, the direction 3 of the air-flow in the chambers will be the same as direction 9 of rotation of the tire 5.

In an embodiment of the invention, air restrictors 56 and/or 67 may be inflatable spheres and may include inflation valves 57.

Although two air restrictors 56 and 67 are shown in FIG. 3, the number of air restrictors may vary, one air restrictor may be used or three or more air restrictors may be used. It is recognized, if multiple air restrictors are used, additional valves 52 may be installed to pressurize the tire 5 if air cannot flow freely between one or more of the air chambers.

In an embodiment of the present invention, a single air restrictor such as restrictor 67 as shown in FIG. 1 may be used to prevent the flow of air inside a tire such as the tire 5. The air restrictor may be of any shape and/or form. The air restrictor may fully or substantially prevent air from passing through. In an embodiment of the invention, the air restrictor may include air passages or vent holes to allow the passage of air. As described herein, the insertion of an air restrictor may reduce or prevent the friction and/or heat generated inside the tire due to such air-flow opposite the direction of rotation of the tire. In accordance with an embodiment, when air-flow inside the tire is reduced or stopped, friction and/or heat inside the tire is substantially reduced. This reduction in friction and/or heat inside the tire may increase the efficiency of the tire and save energy and it may also increase the life of the tire. For example, insertion of one or more air restrictors inside the tires of a car may increase the fuel efficiency by 15% or more. It is recognized that the fuel efficiency may be lower or greater depending on the type, formation, weight, and/or other characteristics of the air-flow restrictor.

In an embodiment of the present invention, multiple air restrictors may be installed inside a tire to prevent the flow of air inside the tire as shown in FIG. 3. For example, if multiple air-flow restrictors are used, one of the air restrictors may not allow air to pass through and the other air-flow restrictor or restrictors may allow air to pass though. In this case, a single air chamber is created inside the tire. The tire can be inflated normally using a single nozzle or valve because a single air chamber inside the tire is created. In one embodiment, a second air-flow restrictor may be used to counter balance the first air-flow restrictor inside the tire.

FIG. 4 is another view of the assembly 110 shown in FIG. 3, in accordance with an embodiment of the present invention. FIG. 4 shows the tire 5, rim 8 and one or more retention collars 6. In addition, FIG. 4 shows air restrictor 67 having vent holes 63 and air restrictor 56 with an inflation valve 57 or nozzle. As indicated above, the valves or nozzles 57 may be provided for air restrictors or the like that are inflatable. In an embodiment, the air restrictor may be a diaphragm, inflatable balloon, a foam structure, and/or any combination thereof.

FIG. 5 shows a wheel assembly 120 in accordance with an embodiment of the present invention. The assembly 120 shown in FIG. 5 may include an air restrictor for restricting the air-flow inside the tire 5. In this embodiment, the air restrictor may be a pair of double spheres 56 which may be installed within retention collars 6. The spheres 56 can be made of, for example, rubber, plastic, latex, foam, and/or any other material. A poly foam strip 72 may be provided to allow inflation of both air chambers A and B and so that pressure in both chambers A and B can remain equal. The poly foam strip 72 may be attached to the tire and/or the spheres 56 using an adhesive or the like. In an embodiment of the present invention, one or more of the double latex spheres 56 may include a blocking latex membrane 34 to stop air circulation inside the tire. It is recognized that one of the air-flow restrictors 56 may permit the passage of air while the other air-flow restrictor may partially, substantially or fully block the passage of air.

FIG. 6 is another view of the assembly 120 shown in FIG. 5, in accordance with an embodiment of the present invention. FIG. 6 shows the tire 5, rim 8 and one or more retention collars 6. In addition, FIG. 6 shows air restrictor 56 having inflation nozzles 57. FIG. 6 also shows the poly foam strip 72 that allows air to flow between the two chambers A and B.

FIG. 7 shows a wheel assembly 130 in accordance with an embodiment of the present invention. The assembly 130 shown in FIG. 7 includes multiple air restrictors inside the air cavity of the tire 5. In an embodiment, as shown, the air restrictor 56 may be a double sphere that includes a wedge shaped poly-foam baffle 32 that may muffle vibrations in the double latex sphere 56. The air restrictor 56 is shown attached with a single retention collar or ring 6. In an embodiment of the invention, the second air restrictor 67 may be installed in the air cavity of the tire 5, as shown. The air restrictor 67 may include an air passage or vent holes that may permit the passage of air through air restrictor 67 such that a single air chamber is created inside the tire 5. As can be seen, in an embodiment of the present invention, air restrictor 67 may be installed using two retention collars or rings 6.

FIG. 8 is another view of the assembly 130 shown in FIG. 7, in accordance with an embodiment of the present invention. FIG. 8 shows the assembly 130 including an air restrictor including foam baffles 32 as well as vent holes 63 in air restrictor 67. In one embodiment, the baffles 32 may be made from, for example, foam, plastic, rubber, open cell material such as open cell foam, and/or other material.

FIG. 9 shows a detailed view of one type of an air restrictor 56 in accordance with one embodiment. In this embodiment, the air restrictor 56 includes a wedge shaped foam baffle 75 and latex bladders 76. In an embodiment of the present invention, the air restrictor 56 includes the latex diaphragm 34 to prevent the flow of air inside the tire 5, for example. In another embodiment, the wedge shaped foam baffle may be made from a foam material and the bladders may be made of latex and may be inflated with air, for example.

FIG. 10 shows a detailed view of an air restrictor 56 in accordance with an embodiment of the present invention. In this embodiment, the air restrictor 56 may be double latex spheres 56 including the latex diaphragm 34. The air restrictor 56 may be installed in a tire to prevent air circulation in the tire, for example. FIG. 10 also shows a detailed diagram of an embodiment of a retention collars or rings 77 which may be used to retain the air restrictor such as the spheres 56. In an embodiment of the present invention, the retention collars 77 may be attached to the tire 5 using an adhesive 73 or other means. It is also recognized that the retention collars 77 may be attached to the rim 8 using an adhesive or other means. In an embodiment of the present invention, one, two, three or more retention collars may be installed to retain the air restrictor.

Figure 11:
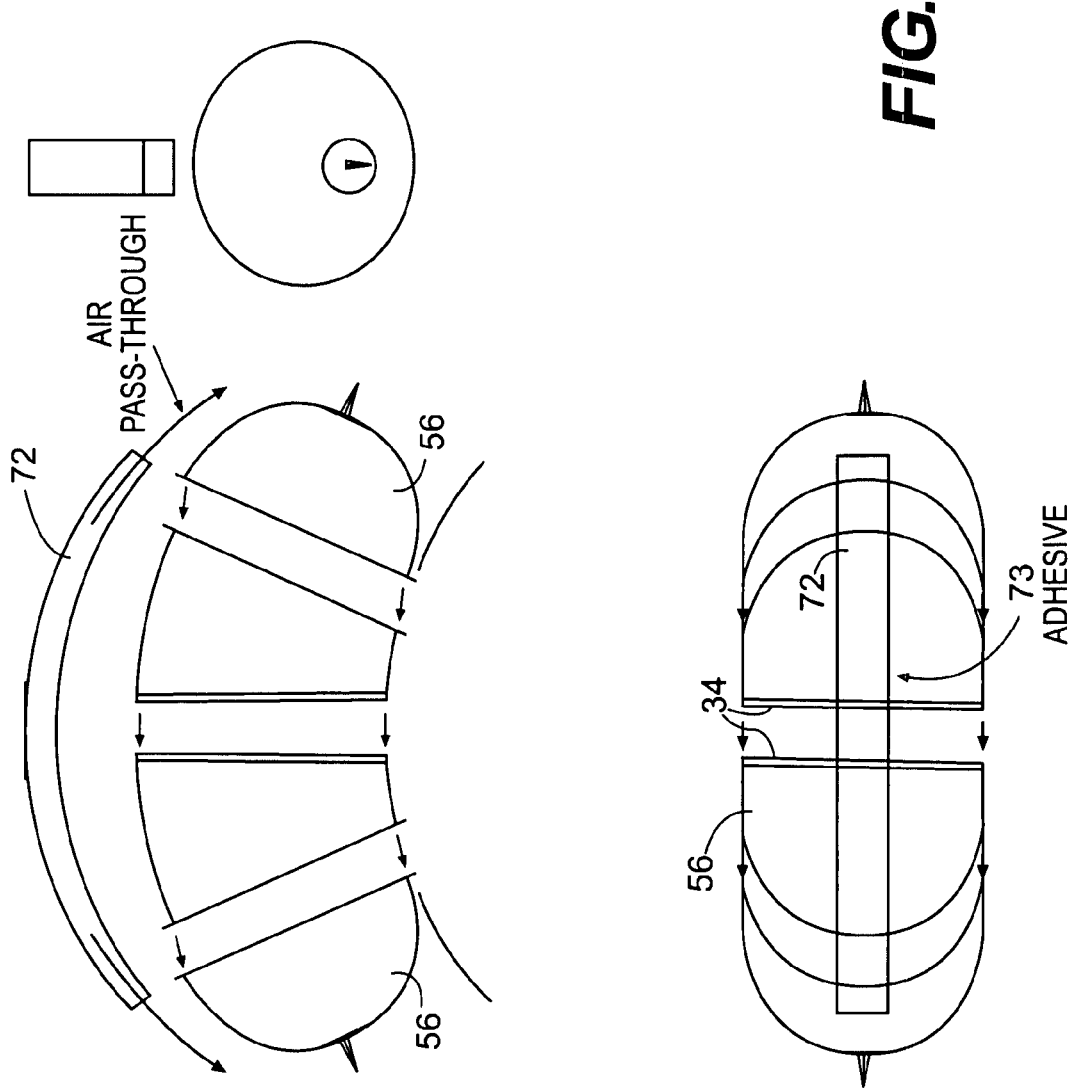
FIG. 11 is a diagram of an air restrictor in accordance with an embodiment of the present invention.

FIG. 11 shows a detailed view of an air restrictor 56 in accordance with an embodiment of the present invention. In this embodiment, the air restrictor 56 may be a double latex sphere 56 including the latex diaphragm 34 that prevents air circulation in the tire 5, for example. The embodiment shown in FIG. 11 may include an open-cell, poly-foam strip 72 that allows the air to pass between two chambers (e.g., chamber A and chamber B) so that the pressure inside the two chambers can be equal. In other words, a single air chamber is formed inside the tire and the tire can be inflated using one nozzle or valve. In an embodiment of the invention, the strip 72 may be attached to the inside of the tire 5 and/or may be attached to the rim 8, for example. The strip 72 may be attached using an adhesive such as glue and/or any other means to attach the strip to the tire 5 and/or rim 8.

Figure 12:
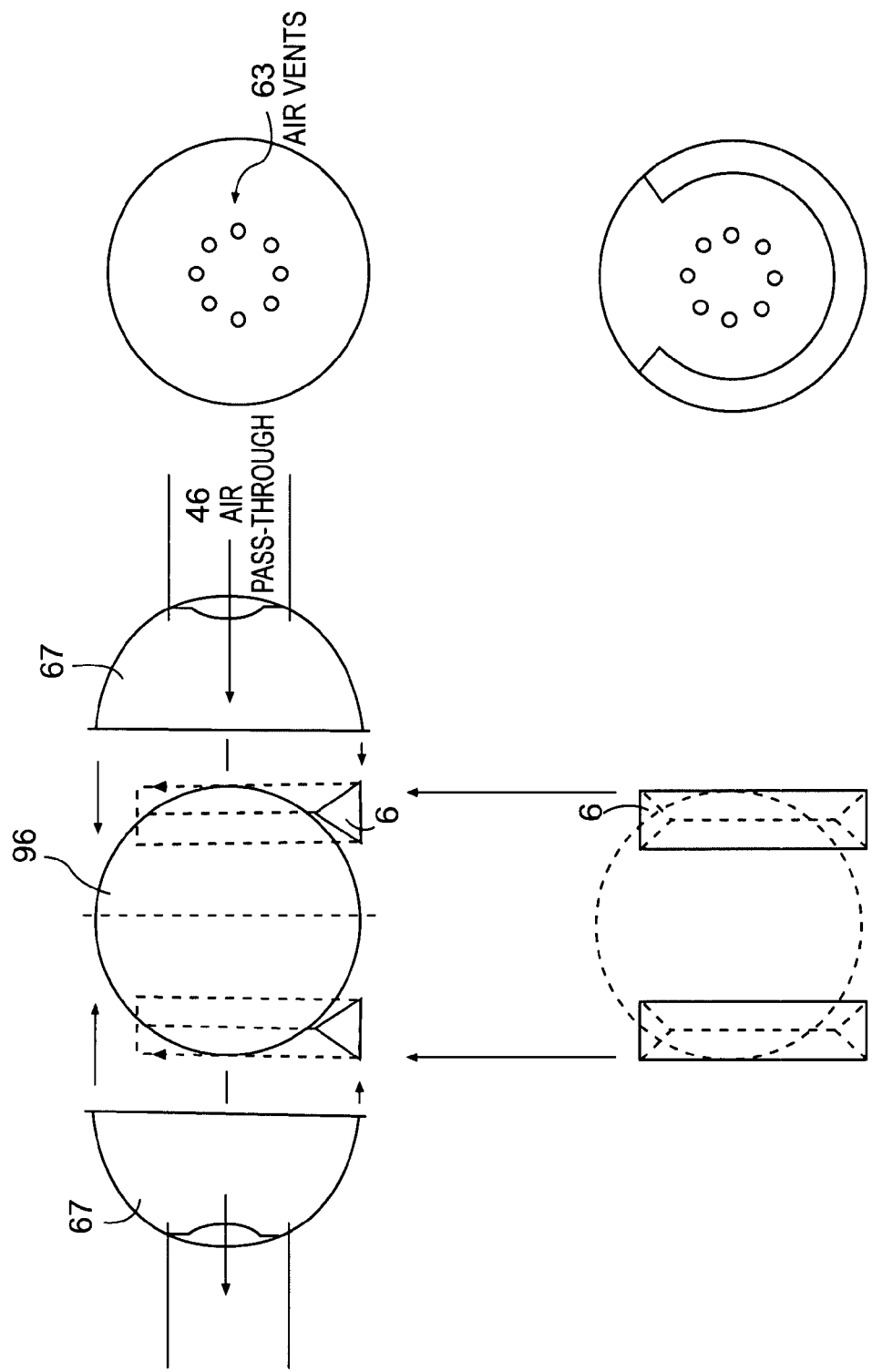
FIG. 12 is a diagram of an air restrictor in accordance with an embodiment of the present invention.

FIG. 12 shows a detailed view of an air restrictor 67 in accordance with one embodiment of the present invention. The air restrictor 67 shown in FIG. 12 is single sphere and latex counter balance weight having air vents 63 for air pass-through for tire inflation, in accordance with an embodiment. The restrictor 67 may be made of, for example, latex and open cell foam, rubber or other material. FIG. 12 also shows how the retention collars 6 may be used to retain the air restrictor 67. In an embodiment of the present invention, the air restrictor 67 may be a latex balloon filled with, for example, air or another gas. In another embodiment, the air restrictor 67 may be an open-cell foam unit covered with a latex cover. The latex cover may be bonded onto the open cell foam using, for example, glue, other adhesive, or the like. The latex cover may be placed on the open-cell foam unit without an adhesive. The air restrictor 67 may or may not include vent holes.

FIG. 13A shows a wheel assembly 140 in accordance with an embodiment of the present invention. The assembly 140 shown in FIG. 13 includes air restrictors inside the air cavity of the tire 5. In this embodiment, the air restrictor 59 may include, for example, a pair of double spheres 59 which may be installed within retention collars. In this embodiment, the air restrictor 59 may include ball shaped baffles 33 which may be made from foam or other material. The double spheres 59 may be separated by a diaphragm 39. The spheres 59 may be inflated with air, for example. The embodiment shown may provide better balance and/or vibration control or suppression inside the tire. In this case, the double spheres 59 may include two (2) air valves for pre-inflation, in accordance with an embodiment of the present invention.

FIG. 13B shows another view of assembly 140 in accordance with an embodiment of the present invention.

FIG. 14A shows a wheel assembly 150 in accordance with an embodiment of the present invention. The assembly 150 shown in FIG. 14 includes air restrictors inside the tire 5. In this embodiment, the air restrictor 60 may include a pair of double spheres 60 which may be installed within retention collars. The spheres 60 may include a half-round shaped foam baffle 31. The baffle 31 may be made of other material. The half-round shaped foam baffle 31 may be separated by a diaphragm 40. The spheres 60 may be inflated with air, for example. The embodiment shown in FIG. 14 may provide better balance and/or vibration control or suppression inside the tire. In this case, the double spheres 60 may include two (2) air valves for pre-inflation, in accordance with an embodiment of the present invention. FIG. 14A also shows how the retention collars may be used to retain the air restrictor 96 in accordance with an embodiment of the present invention.

FIG. 14B shows another view of assembly 150 in accordance with an embodiment of the present invention.

Figures 15A, 15B:
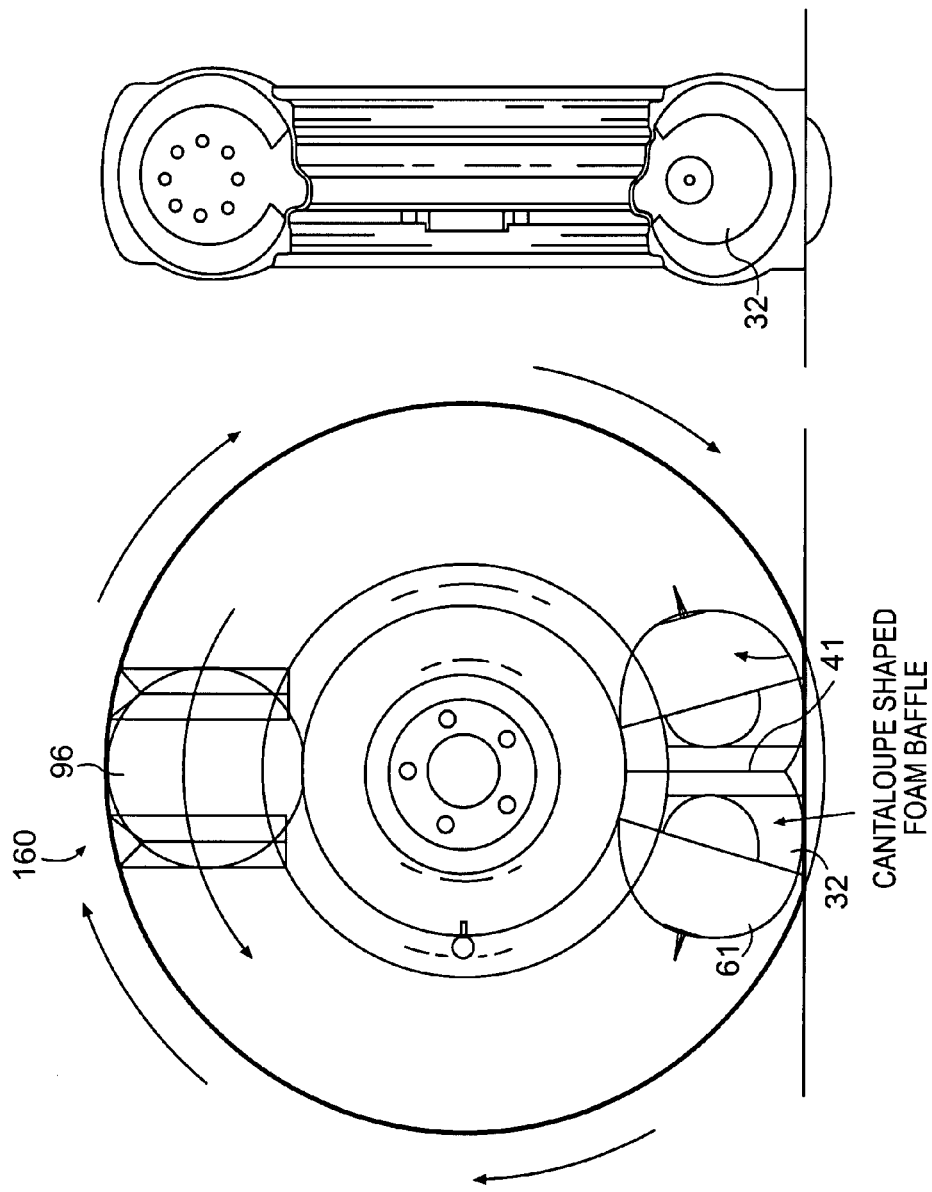
FIGS. 15A and 15B are diagrams of a wheel assembly 160 in accordance with an embodiment of the present invention.

FIG. 15A shows a wheel assembly 160 in accordance with an embodiment of the present invention. The assembly 160 shown in FIG. 15 includes air restrictors installed inside the air cavity of the tire 5. In this embodiment, the air restrictor may include, for example, a pair of double spheres 61 which may be installed within one or more retention collars. The spheres 61 may include a cantaloupe shaped foam baffle 32. The baffle 32 may be made from foam or other material. The cantaloupe shaped foam baffle 32 may be separated by a diaphragm 41. The spheres 61 may be inflated with air, for example. The embodiment shown in FIG. 15 may provide better balance and/or vibration control or vibration suppression inside the tire. In this case, the double spheres 61 may include two (2) air valves for pre-inflation, in accordance with an embodiment of the present invention. It is recognized that the baffle 32 may be of a different shape (e.g., hemisphere) and/or size, for example.

FIG. 15B shows another view of assembly 160 in accordance with an embodiment of the present invention.

Figures 16A, 16B:
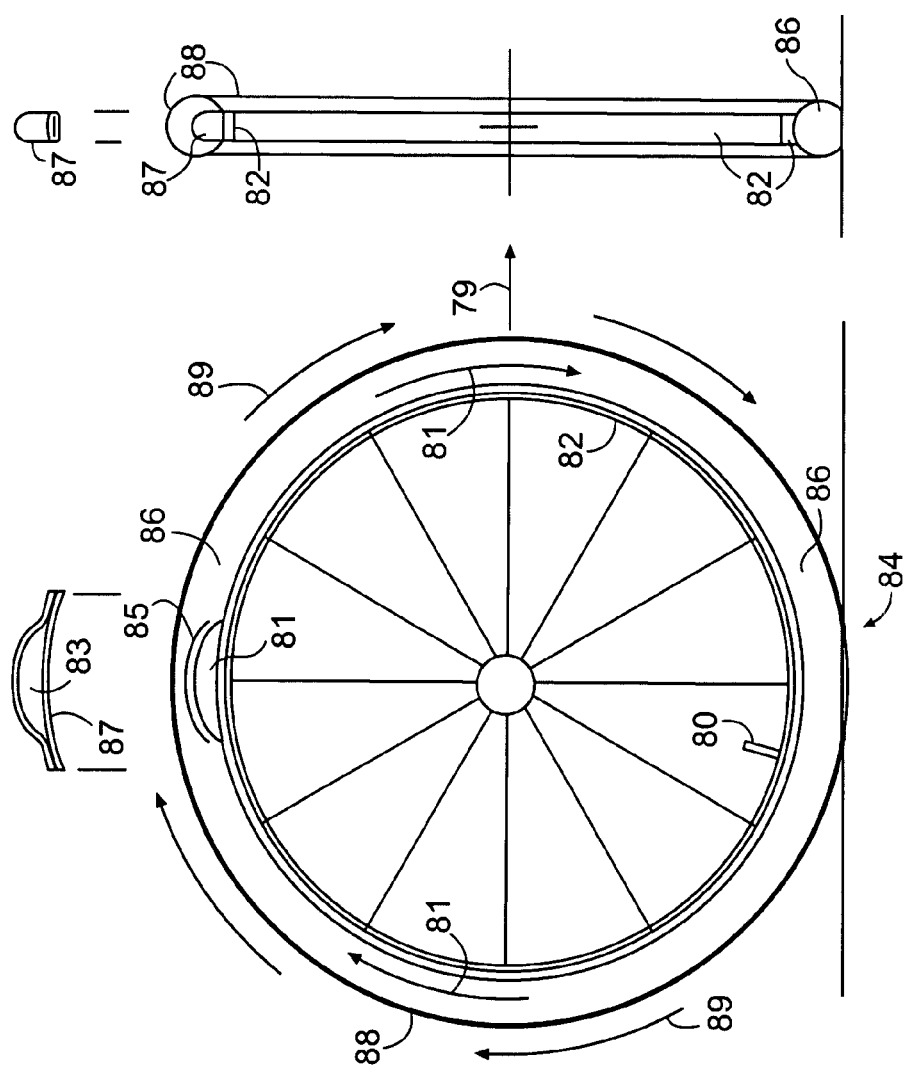
FIGS. 16A and 16B are diagrams of a wheel assembly 88 in accordance with an embodiment of the present invention.

FIG. 16A shows a wheel assembly 88 in accordance with an embodiment of the present invention. Wheel assembly 88 may include an inner tube 86 that may be blocked internally by air restrictor 87, in accordance with an embodiment of the present invention. In this example, the air restrictor 87 may be created by inflating the restrictor 87 with air 83 or may be created by using a flexible poly-foam to block or pinch off circulation of air in the inner tube 86. FIG. 16A also shows the force moment 84 created where the tire 88 makes contact with the surface of the road. In one embodiment of the invention, the air restrictor 87 may be placed opposite the valve stem 80 for counterbalance. The direction of the motion 79 shows the direction the wheel 88 is moving. The rotation 89 shows the rotation of the wheel 88 and the air inside the tire 88 is moving in the same direction 81. In another embodiment of the invention, the inner tube may be folded over and/or glued to prevent the internal flow of air. The air-flow may be restricted inside the inner tube or tire by other ways.

FIG. 16B shows another view of assembly 88 in accordance with an embodiment of the present invention.

Figures 17A, 17B:
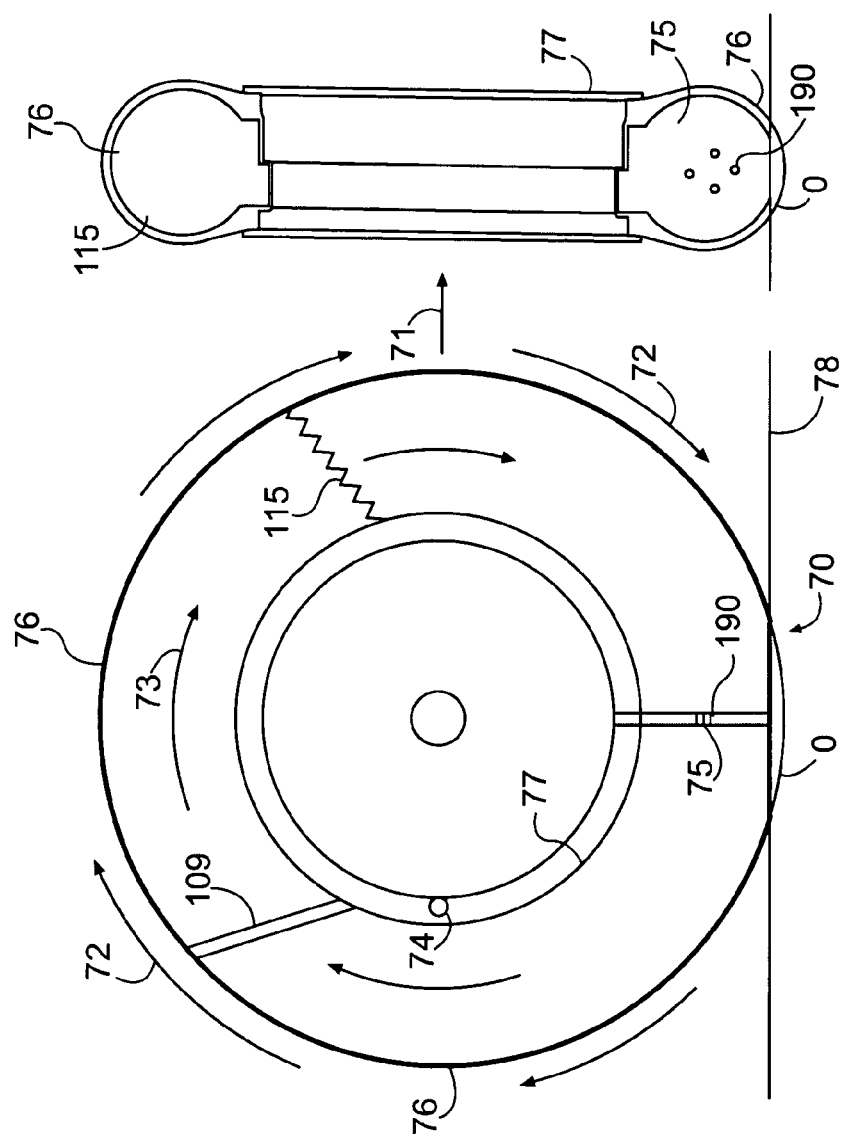
FIGS. 17A and 17B are diagrams of a wheel assembly 76 in accordance with an embodiment of the present invention.

FIG. 17A shows a wheel assembly 76 in accordance with an embodiment of the present invention. As shown, the wheel 76 is moving in direction 71 with a rotational direction 72. In an embodiment of the invention, an air restrictor 75 may be used to block the circulation of air within the tire 76. Once the circulation is blocked, the air would move in the same direction 73 as the rotation of the tire 72. FIG. 17A shows the deflection of the tire to the road surface 78 and the force moment 70 of the tire. In an embodiment of the present invention, air restrictor 75 may be a diaphragm or the like.

In an embodiment of the invention, an air-flow restrictor 109 may be installed at any angle as shown. Optionally or additionally, the air restrictor may be in the shape of an accordion such as restrictor 115. The air restrictors may be made from rubber, plastic, foam and/or other type of material, for example. The air restrictors may be permeable or impermeable to air. One or more of the various air restrictors shown can be used. The air restrictors may be retro-fitted into the tire after the tire has been manufactured and/or may be built inside the tire during the manufacturing process.

FIG. 17B shows another view of assembly 76 in accordance with an embodiment of the present invention. As shown, FIG. 17B is a side cut-out view of assembly 76, in accordance with an embodiment of the present invention. FIG. 17 shows air restrictor 75. In an embodiment of the present invention, air restrictor 75 may include vent holes 190 to allow passage of air. In an embodiment of the present invention, assemble 76 includes air restrictor 115. The air restrictor may or may not include vent holes (omitted).

In an embodiment, a one or more flow restrictors (such as shown in FIGS. 17A and 17B) may be inserted in the cavity of a tire. In an embodiment, the air-flow restrictor may completely, substantially or partially restrict the air-flow inside the tire. In an embodiment, more than one air-flow restrictor may be added inside the tire. If more than one air-flow restrictor is added to the tire, vent holes (e.g., vent holes 190) may be added to one or more of the air-flow restrictors, in accordance with an embodiment of the present.

In an embodiment, a diaphragm, other type of air-flow restrictor or the like may be used for blocking the air movement inside the tire. In an embodiment, single and/or double air balloons may be used to block air inside the tire. The balloons may or may not include inflation valves or nozzles.

In an embodiment of the invention, the flow restrictor may be one or more hollow balloons of any shape and/or made from any material. The balloon or balloons may be located inside a tire to reduce or prevent air-flow. In this embodiment, the balloon(s) or the like may be manufactured into the tire or may be glued into place and/or other retaining means may be used. Optionally or additionally, the one or balloons or the like may be held into place by any type of retention collars, columns, framing, etc. It is recognized that any type of structure or mechanism may be used to retain the diaphragm or flow restrictor. In an embodiment, the structure may be attached to the tire and/or may be attached to the rim and/or wheel. The structure may be glued on, nailed on, welded on, and/or attached to the tire and/or rim using any known means. In an embodiment, the diaphragm or flow restrictor may be provided as an attachment to the rim or wheel.

In an embodiment of the present invention, an air-flow restrictor in the form of, for example, a balloon or diaphragm may be located in the tire or several balloons or diaphragms may be distributed in the tire. The balloons may be pre-inflated before installation or may be inflated after installation. In another embodiment of the present invention, the one or more balloons or another type insertion (e.g., foam ball, hybrid foam/balloon insert, etc.) may be installed in the tire and may be able to freely move within the tire while still reducing or preventing circulation of air inside the tire.

In an embodiment of the present invention, an flow restrictor may be one or more solid and/or partially hollow objects to reduce or prevent the circulation of air inside the tire. The object may be made from foam or any other material and may be of any shape (e.g., round, oval, square, rectangular. triangular, etc.). In an embodiment, the object may be a sheet, panel, etc. made from any material and/or of any shape. The object may be located inside a tire to reduce or prevent air-flow inside the tire.

In an embodiment of the invention, an air-flow restrictor such as a diaphragm, single or multiple spheres or the like may be manufactured into the tire or may be glued into place. Optionally or additionally, the air-flow restrictors may be held into place by any type of retention collars, rings or columns. It is recognized that any type of structure or mechanism may be used to retain the air-flow restrictors. In an embodiment of the present invention, a single object may be located in the tire or several objects may be distributed in the tire.

In an embodiment of the invention, if the flow restrictors such as the balloons contain air, they may be pre-inflated before installation or may be inflated after installation. In an embodiment of the invention, one or more air-flow restrictors may be installed in the tire and may be able to freely move within the tire while still reducing or preventing circulation of air inside the tire.

It is recognized that in an embodiment, the air-flow restrictor such as the diaphragm, spheres, etc. may be built into the tire during the rubber manufacturing process. In an embodiment, the flow restrictor, diaphragm, etc. may be glued, welded, tacked and/or other wise attached to the tire. In an embodiment, the air-flow restrictor, diaphragm, etc. may be attached to the wheel and/or rim. In an embodiment, an attachment for the tire rim may be provided. In an embodiment, an air-flow restrictor or diaphragm may be built into the rim and/or wheel when it is manufactured or may be attached later. It may be attached via, for example, nails, staples, tacks, weld, glue and/or other means.

In an embodiment of the present invention, the air-flow restrictors as described herein may be available as a kit which may be retrofitted onto an existing tire. The kits may include, for example, one or more air-flow restrictors, one or more retention collars, an adhesive or other means for attachment, and/or any other material to install the air-flow restrictor, in accordance with an embodiment of the present invention.

An embodiment of the present invention may completely restrict air-flow inside a tire. This restriction of the air-flow may significantly reduce the friction inside the tire and may increase the fuel efficiency of the vehicle on which the tire is installed.

In an embodiment of the invention, an air-flow restrictor may be made of a flexible material and may be positioned inside an inflatable tire to reduce or prevent air-flow.

In an embodiment of the invention, an air-flow restrictor may be used to block air movement. In one embodiment, a diaphragm, or a single or double air balloons having valves may be used as air-flow restrictors. If balloons or objects containing air are used, these may be pre-inflated before installation or inflated after installation. In an embodiment of the present invention, a tire may include at least two forms of air-flow restrictors. In this case, one of the air-flow restrictors may be permeable to fluids such as air, while the other air-flow restrictor may be impermeable to fluids, such as air. In this manner, one of the air-flow restrictors may block the flow of air within the tire while the other air-flow restrictor does not. In an embodiment of the present invention, only one diaphragm may be installed inside a tire.

In an embodiment of the present invention, the air-flow restrictor such as a diaphragm or the like may be made from, for example, latex, plastic, or other material. Optionally, it may be made from, for example, open cell foam or the like. An air-flow restrictor made from open cell foam, for example, may be permeable and may permit the passage of fluids such as air.

In an embodiment of the invention, a single or multiple air-flow restrictors may be included inside a tire to stop air-flow inside the tire. For example, they may be distributed throughout the tire and/or may be used as counter balance units. The air-flow restrictors may be a single or double units, as described herein.

In an embodiment of the invention, one or more air-flow restrictors may be made from permeable material such as open cell foam or may include passages or vent holes to permit the passage of air. Such air-flow restrictors when installed may permit air to pass through and maintain equal pressure inside the tire. In one embodiment, if for example, two air-flow restrictors are installed and if one of the air-flow restrictors allows air to pass through, then a single air chamber inside the tire may be created. Since one of the air-flow restrictors does not permit passage of air, the air may not flow counter to the direction of tire rotation. In this case, a single valve may only be needed to inflate the tire since all but one of the air-flow restrictors may permit the passage of air inside of the tire. If multiple air flow restrictors that do not permit the passage of air are used, then additional valves may be added to inflate the tire.

In an embodiment of the present invention, if multiple air-flow restrictors that do not permit the passage of air are installed, then multiple chambers may be created in the tire. In such a case, each chamber may need its own inflation valve so that the chamber can be inflated separately.

In an embodiment of the present invention, a pressure monitoring device may be incorporated within one or more chambers of the tire to monitor the pressure in each chamber and/or to generate an alert if there is discrepancy and/or low or high pressure in one or more chambers. The alert may be presented to an operator of the vehicle or a remote operator through a remote monitoring device.

In an embodiment of the invention, a diaphragm or other type of air-flow restrictor may be made of or may include Lycra®, Teflon, nylon, or other synthetic or other type of materials for additional strength and/or durability. For example, netting made from Lycra®, Teflon, nylon, or other synthetic type of material may be used and/or placed around the a diaphragm or other type of air-flow restrictor for extra strength and durability. In an embodiment, additionally or optionally, foam or a foam type material may be inserted inside the tire. Foam or similar material may be spread throughout the tire to prevent air-flow and reduce friction inside the tire, in accordance with an embodiment of the present invention.

In an embodiment of the invention, a diaphragm or other type of air-flow restrictor may reduce friction inside the tire. In an embodiment, one or more diaphragms or air-flow restrictors may create a fly-wheel effect that may store energy. In one example, a diaphragm or other type of air-flow restrictor in accordance with an embodiment of the present invention may be very light (e.g., 8 oz. or less, or may be more than 8 oz.). It is recognized that if the air restrictor is like the air restrictor shown in, for example, FIGS. 17A and 17B, it may be lighter.

In an embodiment of the present invention, the air-flow restrictors installed in one or more tires may be of varying weights. For example, some of the air-flow restrictors may be of one weight and/or other air-flow restrictors may be heavier or lighter. Air-flow restrictors installed in different tires may also vary in weight. For example, air-flow restrictors installed in front tires may be heavier or lighter than the air-flow restrictors installed in rear wheels of a vehicle.

In an embodiment of the invention, one or more diaphragms or other type of air-flow restrictors may be included inside the tire to stop air-flow or circulation inside the tire. The one or more diaphragms or air-flow restrictors may be fully, partially or substantially filled with air. In an embodiment, the one or more diaphragms or air-flow restrictors may be made from foam or other material. It is recognized that the one or more diaphragms or air-flow restrictors may be fully, partially or substantially filled with air and other one or more diaphragms or air-flow restrictors, located in the same tire, may be solid (e.g., made form foam or other material).

In an embodiment of the invention, a baffle (e.g., foam ball 33 and/or 31) may be included for reduced vibration.

In an embodiment of the invention, a counterbalance sphere or diaphragm may be installed in addition to the air restrictor diaphragms. The counter balance may be installed to balance out the tires. It is recognized that additional wheel balancing may be needed to balance out the tires. This additional wheel balancing may be provided by external weights, internal weights, and/or other counter balances of different shapes, weights and/or sizes.

In an embodiment of the invention, an air chamber and/or vent holes may be provided in, for example, the counterbalance spheres or diaphragms so that air may be provided via a single stem and the pressure throughout the tire can be equal. In an embodiment, no air chamber and/or vent holes may be provided. In this case, additional air stems may be provided to add air in the tire and/or to make air pressure inside the tire equal throughout the tire. In an embodiment, sensors may be placed inside the tire to monitor the air pressure in, for example, the various chambers that may be created by using the air restrictor, counter balance, etc.

An embodiment of the present invention may extend the life of the tire and/or provide additional and/or extend mileage. An embodiment may extend life of the tire because of reduced friction and/or reduced heat generated. An embodiment of the present invention may provide faster acceleration and/or increased top speed due to for example a fly wheel effect.

Any embodiment of the present invention may reduce overall fuel consumption of the vehicle including tires as described herein. For example, overall fuel consumption may be reduced by 20%-30% or more. In some cases, the overall fuel consumption may be reduced less than 20%. An embodiment of the present may provide increased fuel efficiency of all types of vehicles or the like. An embodiment of the present invention may increase miles-per-gallon ratings for vehicles. The vehicles may include cars, trucks (e.g., 18 wheelers, etc), buses, vans, bicycles, motorcycles, go-carts, military vehicles, airplanes or other types of transportation and/or recreational vehicles or the like. An embodiment of the present invention may find application within any type of inflatable tire and/or any type of vehicle or device.

It is recognized that, in a vehicle having an air filled tire all or only a few of the tires may include the air restrictor(s) or diaphragm(s), in accordance with an embodiment of the present invention. For example, in a car, only the front two or rear two tires may be equipped with the diaphragm(s), as described herein, in accordance with an embodiment of the present invention. In another example, only one of the front tires and/or only one of the rear tires may be equipped with the diaphragm(s), as described herein, in accordance with an embodiment of the present invention. Likewise, less than all the tires of a truck, bike, motorcycle, etc. may be equipped with the air restrictor(s) or diaphragm(s), as described herein, in accordance with an embodiment of the present invention.

Retaining collars or structure for the one or more diaphragms or air-flow restrictors used may be open cell foam retaining collars, for example.

In an embodiment of the invention, an air-flow restrictor or diaphragm may be provided that may install or activate automatically and/or at the request of a user. For example, the flow restrictor or diaphragm may eject out from the rim, wheel and/or tire when the tire and/or vehicle reaches a predetermined speed and/or based on a request from the driver or user. The flow restrictor or diaphragm may retract when the tire or vehicle is below a certain speed, for example, or based on a request from a driver or user.

Several embodiments of the present invention are specifically illustrated and/or described herein. However, it will be appreciated that modifications and variations of the present invention are covered by the above teachings without departing from the spirit and intended scope of the invention.

What is claimed is:

1. A method for retrofitting a tubeless tire with air movement restricting inserts, comprising:
   providing a tubeless tire comprising a circumferential inflatable tire cavity;
   inserting an inflatable air-flow restrictor in the tire cavity, wherein air inflating the tire cavity cannot pass by the air-flow restrictor in a circumferential direction of the tire cavity; and
   inserting a partial air-flow restrictor in the tire cavity, wherein a chamber of air is formed between the inflatable air-flow restrictor and the partial air-flow restrictor and wherein the partial air-flow restrictor comprises an air passage to permit air flow through the partial air-flow restrictor into the chamber of air.

2. The method of claim 1, wherein the partial air-flow restrictor is inserted in the tire cavity on an opposite side of the inflatable air-flow restrictor 3. The method of claim 1, wherein the partial air-flow restrictor is inflatable.

4. The method of claim 1, wherein the partial air-flow restrictor comprises open cell foam.

5. The method of claim 1, wherein the air passage of the partial air-flow restrictor comprises open cell foam to permit air flow through the partial air-flow restrictor into the chamber of air.

6. The method of claim 1, wherein the air passage of the partial air-flow restrictor comprises one or more vent holes to permit air flow through the partial air-flow restrictor into the chamber of air.

7. The method of claim 1, further comprising:
inserting a retaining structure into the tire cavity, wherein the retaining structure retains the inflatable air-flow restrictor or the partial air-flow restrictor in the cavity of the tire.

8. The method of claim 7, wherein the retaining structure is attached to the tire.

9. The method of claim 7, further comprising attaching the retaining structure to a wheel rim, wherein the wheel rim closes the tire cavity.

10. The method of claim 1, further comprising:
incorporating a second chamber of air in the tire cavity, wherein the air passage of the partial air-flow restrictor permits air flow from the second chamber of air into the chamber of air.

11. The method of claim 1, wherein the inflatable air-flow restrictor comprises one or more of plastic, foam, rubber and latex.

12. The method of claim 1, wherein the partial air-flow restrictor comprises one or more of plastic, foam, rubber and latex.

13. The method of claim 1, wherein the partial air-flow restrictor counterbalances the inflatable air-flow restrictor.

* * * * *